(No Model.) 4 Sheets—Sheet 3.
S. W. WARDWELL, Jr.
BICYCLE ATTACHMENT.
No. 584,100. Patented June 8, 1897.
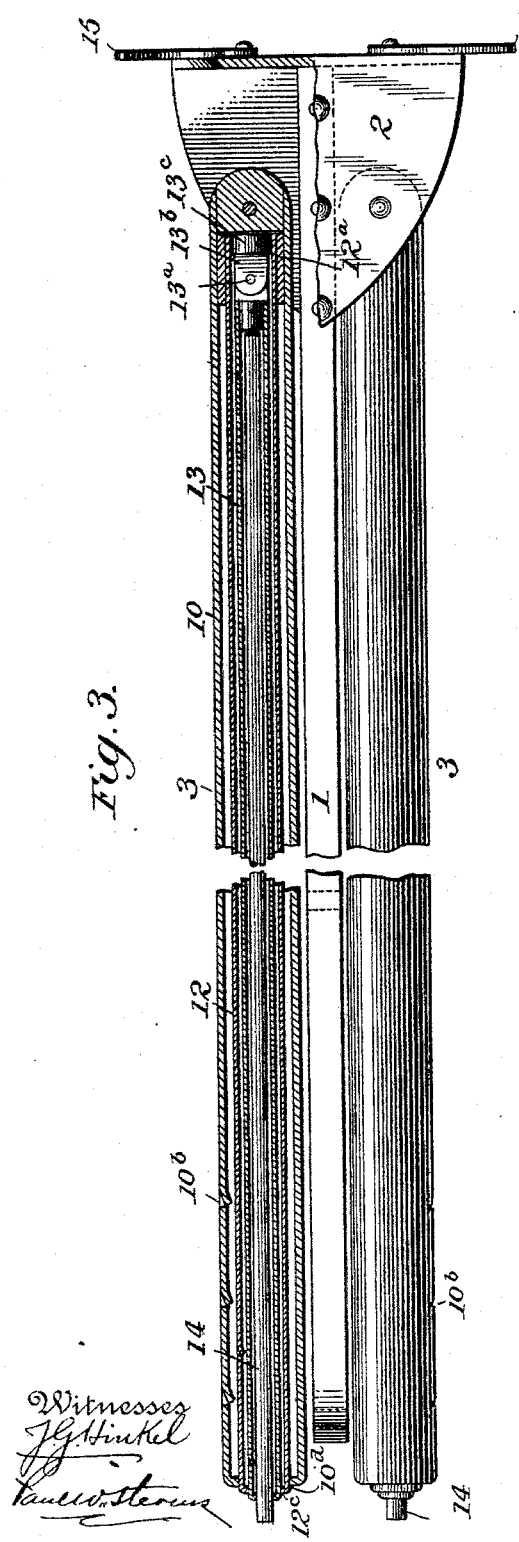
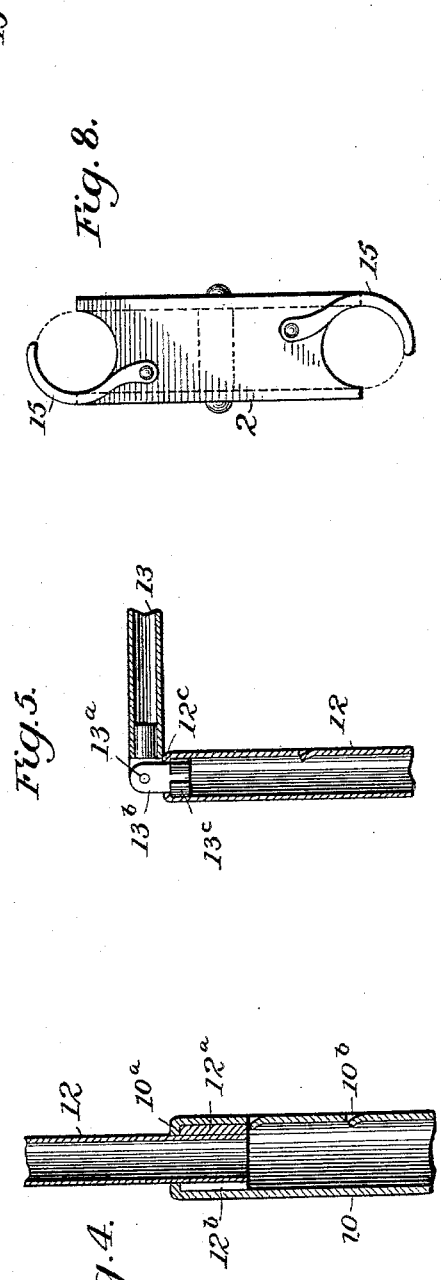
Witnesses
J. G. Hinkel
Paul W. Stevens
Inventor
Simon W. Wardwell, Jr.
By Taylor Freeman
Attorneys.

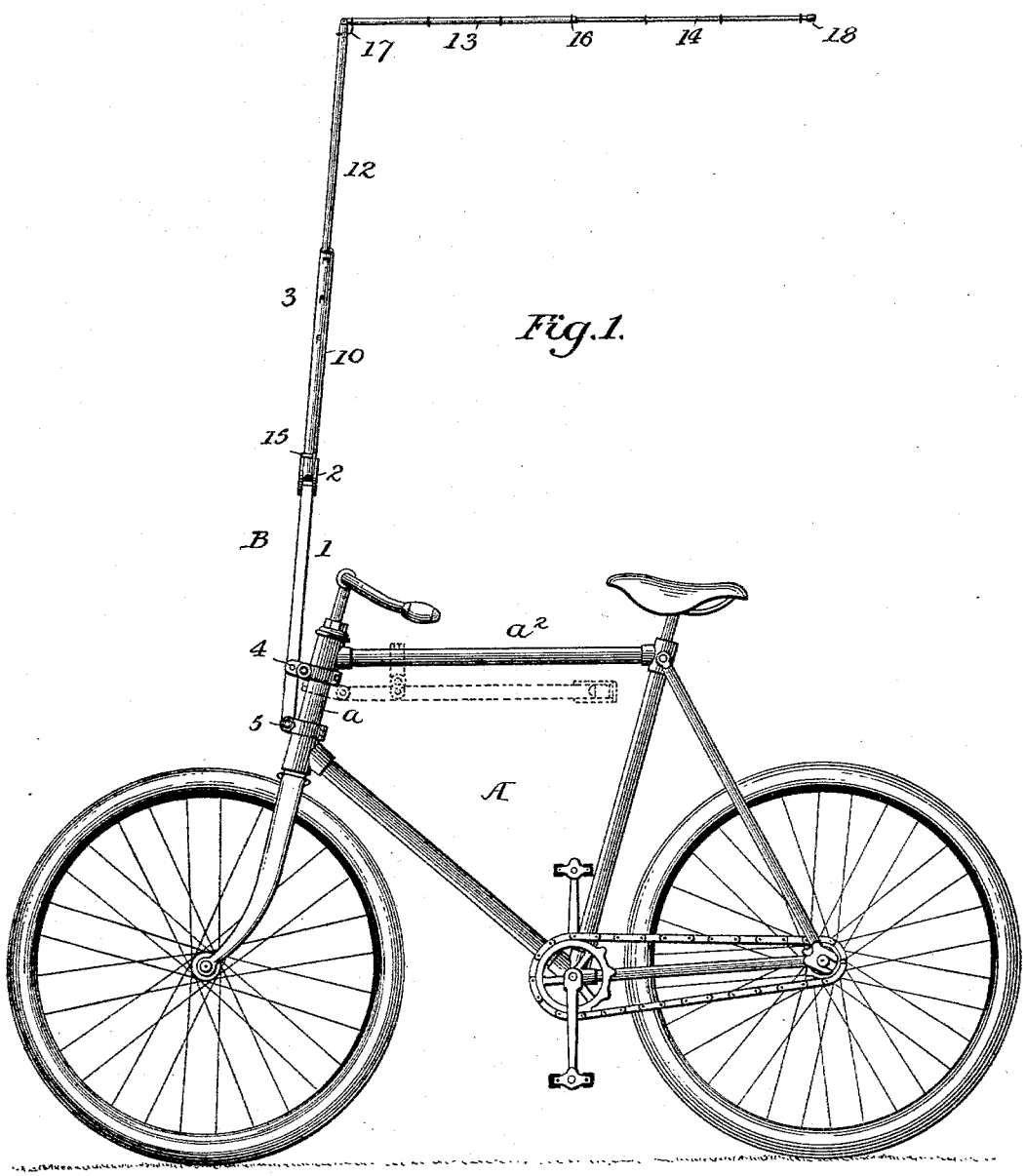

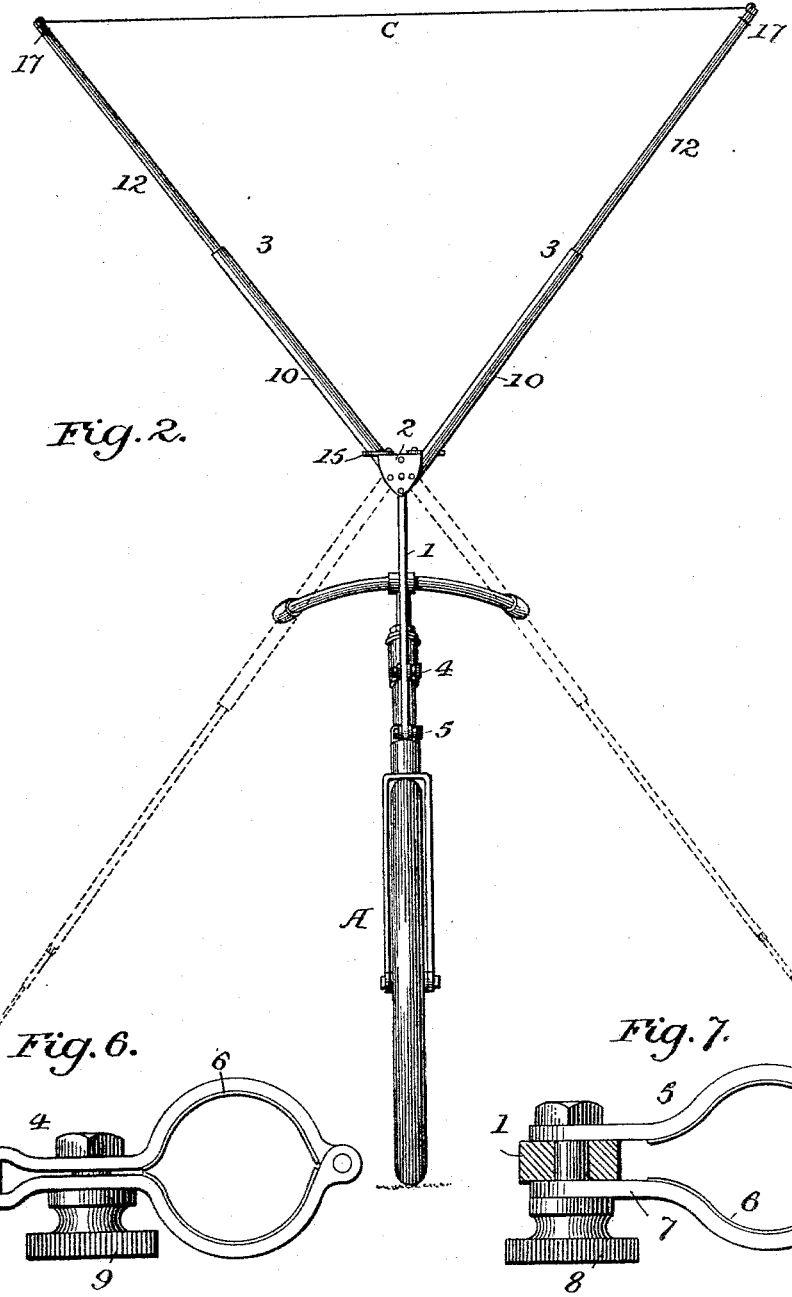

(No Model.) 4 Sheets—Sheet 4.
S. W. WARDWELL, Jr.
BICYCLE ATTACHMENT.
No. 584,100. Patented June 8, 1897.
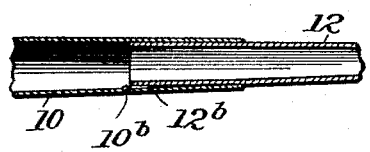
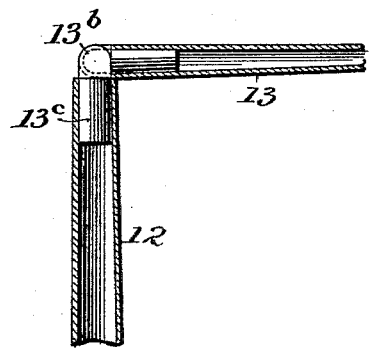
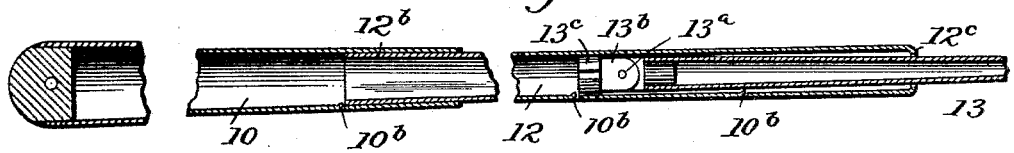
Witnesses
J. G. Hinkel
Inventor
Simon W. Wardwell, Jr.
By Faxter Freeman
Attorneys

UNITED STATES PATENT OFFICE.

SIMON WILLARD WARDWELL, JR., OF PROVIDENCE, RHODE ISLAND.

BICYCLE ATTACHMENT.

SPECIFICATION forming part of Letters Patent No. 584,100, dated June 8, 1897.

Application filed August 12, 1896. Serial No. 602,579. (No model.)

*To all whom it may concern:*

Be it known that I, SIMON WILLARD WARDWELL, Jr., a citizen of the United States, residing in the city and county of Providence, State of Rhode Island, have invented certain new and useful Improvements in Bicycle Attachments, of which the following is a specification.

This invention relates to an improvement in canopies for bicycles and other vehicles and which is also adapted to serve as a support to maintain the bicycle in an upright position to obviate the necessity of leaning it against a tree, wall, &c.

It is the object of the invention to provide a simple and inexpensive canopy which may be quickly adjusted to protect the rider from rain or from the rays of the sun, and the frame of which when not in use may be folded into small compass and carried upon the bicycle in such position as will not interfere with or inconvenience the rider in propelling the machine.

In the accompanying drawings, forming a part of this specification and in which like letters and numerals of reference indicate corresponding parts, Figure 1 is a side elevation of a bicycle with my invention applied thereto, the canopy-frame being in its open or extended position, the folded position of the canopy-frame being indicated in dotted lines. Fig. 2 is a front elevation of Fig. 1, the position of the canopy-frame when serving as a support for the bicycle being shown in dotted lines. Fig. 3 is a plan view of the canopy-frame in its folded position, partly being in section. Figs. 4 and 5 are enlarged detail sectional views of different joints of the canopy-frame. Figs. 6 and 7 are detail views of the clamps. Fig. 8 is a plan view of the bifurcated head of the stem. Fig. 9 is a longitudinal sectional view, parts being broken away, of a modified construction of the telescoping sections, two of said sections being shown as tapering. Figs. 10 and 11 are detail sectional views of the joints between the different telescoping tapering sections, and Fig. 12 is a cross-sectional view of Fig. 10.

Referring more particularly to the drawings, A indicates a bicycle of any well-known or desired construction.

$a$ indicates the steering-head, and $a^2$ the top bar of the frame.

B is the extensible canopy-frame, supported in any suitable manner and at any suitable point upon the bicycle-frame. As shown in the drawings, this frame is supported upon the steering-head $a$. This canopy-frame consists, preferably, of a stem or bar 1 of suitable length provided at one end with a bifurcated head 2 and of two extensible sections 3 3, pivotally supported on the bifurcated head 2 upon opposite sides of the stem 1 and adapted when in their normally closed or folded position to lie parallel therewith.

In use the stem 1 is supported upon the steering-head by one or more suitably-constructed clamps, (two being shown in the present instance.) These clamps 4 5 each consist of two pivoted jaws 6, formed to embrace the steering-head $a$, and each provided with a perforated portion or lug 7, between which portions the stem of the canopy-frame is received. The extended portions are parallel to each other and are secured together by means of thumb-screws 8 and 9, the shanks of the screws of the lower clamp 5 extending through the perforations in the extended portions 7 and an alining perforation in the lower end of canopy-frame stem 1. From the lower clamp the stem 1 extends upwardly between the extended portions of the upper clamp 4 and is secured by means of a pin or screw passing through it and the said extended portions, these portions being in turn secured together by means of a thumb-screw 9, intermediate the stem 1 and the clamp proper. The inner faces of the clamp 4 5 are provided with a flexible lining, of chamois, rubber, leather, &c., to prevent scratching or otherwise injuring the frame of the bicycle.

The pivoted extensible sections 3 3 may be constructed in various ways; but I prefer to form each section of two or more telescoping tubes, in order that when retracted all of the tubes may be inclosed within the outer tube, thereby protecting them and giving the frame a more compact and neat appearance.

In the construction shown each of the sections 3 is composed of four tubes 10 12 13 14, the outer one 10 of which is pivotally supported at one end in the bifurcated head 2 of the stem in such manner as will permit it to move in a direction transverse to that in which the bicycle travels. The outer diameter of the tube 12 is less than the inner diameter of tube 10, in which it is normally inclosed, and at its inner end it is provided with a flange or collar $12^a$, which bears upon the interior of the tube 10. The tube 12 slides within the tube 10, and when it is fully extended the collar $12^a$ bears upon an inwardly-turned flange $10^a$ at the outer end of the tube 10, which prevents the separation of the tubes. In order to permit the tube 12 to be extended different distances and held in the positions to which it is adjusted, the inner face of the outer tube 10 is provided with a series of projections $10^b$, adapted to aline with a channel $12^b$ in the collar $12^a$ as the tube 12 is being drawn out or extended, and when the desired adjustment of the tube 12 has been attained the tube is given a partial rotation to bring a solid portion of its collar over one of the projections $10^b$, whereby the return movement of the tube is prevented.

The tube 13 slides within the tube 12, and at its lower end it is provided with a flattened extension which is pivoted at $13^a$ between a bifurcated extension $13^b$ from a channeled collar $13^c$, which fits closely the interior surface of the tube 12 and is adapted to slide within said tube, its outward movement being limited by the inwardly-turned flange $12^c$ at the end of the tube 12. The bifurcated extension of the collar $13^c$ corresponds in width to the diameter of the tube 13 and is adapted, when said tube is fully extended, to project beyond the end of the tube 12, whereby the tube 13 may be swung to a horizontal plane and substantially at right angles to the tube 12.

The tube or rod 14 slides within the tube 13, and its construction and operation are identical with that of the tube 12.

In opening the canopy-frame (see Figs. 1 and 2) the stem 1 is secured vertically on front of the steering-head by means of the clamps 4 5. The tubes 10 are then extended and together with the tubes 12 are swung upon the pivots of the former to diverge upwardly, they being secured in this position by means of pivoted hooks 15, carried upon the bifurcated head 2. The tubes 13 14 are then adjusted to their extended positions and swung to a horizontal plane to overhang the bicycle and serve as a support for the canopy.

The canopy C may be formed of any suitable fabric, preferably waterproof, and is shaped to fit the space between the tubes 13 14. The canopy may be secured to the tubes in any desired manner, but I prefer to provide it at its edges with rings 16, adapted to receive the tubes 13 14. At its front edge the canopy is provided with hooks 17, which engage the tubes 12, and at its rear edge it is provided with thimbles 18, fitting over the ends of the tubes 14 and in connection with the hooks 17 serving to hold the canopy taut in the direction of its length, thereby preventing the resistance which would be occasioned by the exposure of an extended surface of the canopy to the wind.

When the invention is to be employed to support the bicycle in an upright position, the canopy is removed and the tubes 13 14 brought to a vertical position. Prior to this, however, the bifurcated extension $13^b$ of the tube 13 is drawn into the tube 12, in order to prevent the tube 13 swinging at an angle to its inclosing tube 12. After the tubes 13 14 have been brought to a vertical position they, together with the tubes 10 12, are swung downwardly, so as to diverge from the pivotal point of the tubes 10 and until the ends of the sections 14 rest in contact with the ground, as shown in dotted lines, Fig. 2.

When not in use, the tubes 12, 13, and 14 are retracted and the tubes 10 are swung down parallel to the stem 1. The clamp 4 is then disconnected from the steering-head $a$, and the clamp 5 is moved vertically upon the steering-head in the direction of the handle-bar. Said clamp is then partially rotated upon the steering-head to bring the stem and tubes 10 10 beneath and parallel to the top bar $a^2$ of the frame, after which the clamp 4 is connected to said top bar to support the end of the stem 1, as indicated in dotted lines, Fig. 1.

In Figs. 1 to 5 I have illustrated the telescoping sections or tubes as being straight, but it will be readily understood that they may be formed tapering, as shown in Figs. 9 to 11, and in lieu of providing the outer ends of the tubes with inwardly-turned flanges to limit their outward movement the said outer ends are of less diameter than the inner ends of the tube they inclose, and consequently when said tube is projected its inner end comes in contact with the interior surface of the inclosing tube at its outer end and the separation of the tubes is prevented.

It will be understood from the above that I do not wish to be limited to any particular form of the telescoping tubes, as they may be either straight or tapering, as desired, or the canopy-frame may be composed of both straight and tapering tubes.

Without limiting myself to the precise construction shown, what I claim is—

1. The combination with a bicycle of an extensible frame pivotally supported upon the bicycle and adapted to be swung to one side to serve as a support for the bicycle and to be swung upward to serve as a canopy-support, substantially as described.

2. The combination with a bicycle of a sectional telescoping frame pivotally supported upon the bicycle and adapted to be swung to one side to serve to support the bicycle in an upright position and to be swung upwardly to serve as a support for a canopy, the sections of said frame being provided with internal projections and their ends with exterior channeled enlargements, substantially as described.

3. The combination of a sectional telescoping frame, and means for attaching it to a support, the sections of said frame being tapered and the diameters of the openings in their outer ends being less than that of the rear ends of the sections they inclose, and said sections being provided with internal projections and their rear ends with exterior channels substantially as described.

4. The combination of a sectional telescoping frame, and means for attaching it to a support, the sections of said frame being provided with internal projections and their ends with exterior channeled enlargements, substantially as described.

5. The combination of a sectional telescoping frame, and means for attaching it to a support, a collar provided with a reduced extension adapted to slide longitudinally in one of the frame-sections and another section pivoted to the extension of the collar, all of the sections of the frame adapted to be wholly inclosed in the end one, substantially as described.

6. In a canopy, the combination of a sectional telescoping frame, sections of said frame being pivoted together whereby they may be adjusted at an angle to each other, and a canopy provided with a series of separated rings adapted to receive the frame-sections, substantially as described.

7. In a canopy, the combination of a sectional frame, sections of which are pivoted together whereby they may be adjusted at an angle to each other and a canopy provided with a series of separated rings and with end thimbles adapted to receive the frame-sections, substantially as described.

In testimony whereof I have signed my name to this specification in the presence of two subscribing witnesses.

SIMON WILLARD WARDWELL, JR.

Witnesses:
EDWIN C. SMITH,
SAML. P. COOK.